United States Patent Office 3,275,409
Patented Sept. 27, 1966

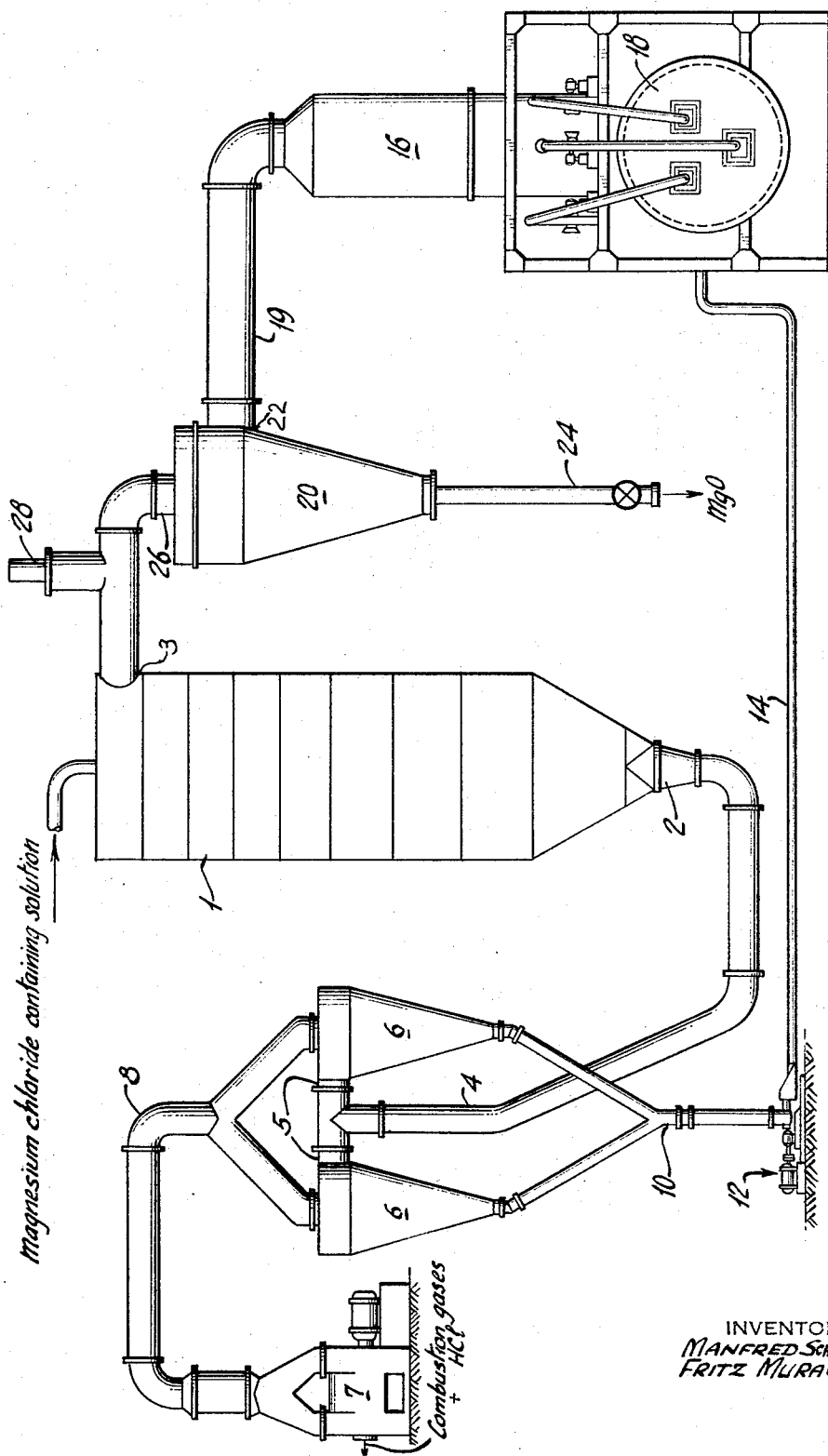

3,275,409
PROCESS FOR THE PRODUCTION OF MAGNESIUM OXIDE FROM MAGNESIUM CHLORIDE HYDRATE
Manfred Schubert, Dresden, and Fritz Murawsky, Sondershausen, Germany, assignors to Zentrale Forschungsstelle für Die Kali-Industrie Beim VEB Kaliwerk "Gluckauf" Sondershausen, Sondershausen, Germany
Filed Dec. 29, 1961, Ser. No. 163,281
3 Claims. (Cl. 23—201)

This invention relates to a process for the production of magnesium oxide from solutions or salts containing magnesium chloride.

Various methods are known for the manufacture of magnesium oxide, which differ mainly in the starting material of the process. One of the most simple processes consists of calcining pure magnesite which yields a product containing magnesium oxide in useful concentrations. According to other processes, various other magnesium-containing raw materials can be processed by hydrochemical treatment.

According to another process, raw material from salt lakes has been used whereby magnesium oxide has been produced by precipitating magnesium hydroxide by means of limestone or dolomite, and subsequently, the precipitated magnesium hydroxide is dehydrated.

According to another known process, magnesium chloride hexahydrate is decomposed by treating it with high-pressure steam. This method has certain drawbacks, because the hydrochloric acid which is formed as a by-product forms a very dilute solution in combination with the steam, and, therefore, it is of slight or no commercial value.

According to another process for the decomposition of magnesium chloride, a solution or melt of magnesium chloride-hydrate is atomized and the atomized particles, together with steam, are conducted upward through a reaction chamber which is heated to a minimum of about 1500° C. Since steam is present, hydrochloric acid is formed which is again too dilute for being of any substantial usefulness. Various experiments have been published describing attempts for decomposing of magnesium chloride hydrate into magnesium oxide without the presence of steam, but these experiments have led to no useful results. The reacting mass usually melts during the process and forms a solid deposit on the walls of the furnace. In the known types of rotary kilns, this adherence of the reacting mass on the walls and the accompanying formation of solidified layers prevents the uniform decomposition of the magnesium chloride hydrate. As a consequence, the effectiveness of the equipment is materially reduced and the process becomes uneconomical. Attempts to remove such deposits by impact or other known mechanical means did not prove successful. Under such conditions the production can proceed only for a few hours and then the operation has to be stopped to remove the solid material from the rotary kiln.

Known rotary kilns operate on two principles which can be summarized as follows: (1) the concurrent flow principle and (2) the countercurrent principle. According to the first principle the direction of flow of the material to be decomposed coincides with the direction of flow of the heating gas; according to the second principle, the reacting mass flows in the opposite direction from the heating gas. Both methods have considerable disadvantages. In the concurrent flow type of process the dwell time of the material in the rotary kiln is too long, while in the countercurrent process the above-mentioned difficulties of the solid layer formation occur.

According to one attempt to overcome the above-mentioned difficulties, a shaft furnace was used to decompose the reacting mass in a countercurrent type of indirect flow, by using a ceramic refractory muffle. This method was found to have a very low production rate and it was accompanied by large heat losses because of the indirect means of heat transfer. Difficulties arose also in the removal of the hydrochloric acid. Finally, the operation was found to require considerably large space.

According to a process described in U.S. Patent No. 2,809,880, the decomposition of the magnesium chloride hydrate is effected in a sloping rotary kiln which is heated by natural gas. The material is fed by passing it through the flame in the combustion chamber. In order to accomplish the desired decomposition, the material is heated to about 500° C. while it passes through the furnace in form of a bed having a thickness of approximately 150 mm. at the feeding side and about 50 mm. at the discharge, and the material remains from 30–70 minutes in the furnace. Although, according to this patent, the material does not melt, and it does not form any deposits; the process is not very advantageous because of the relatively long dwell time of the material in the furnace.

It is an object of this invention to provide a process for the production of magnesium oxide from salts or solutions containing magnesium chloride, eliminating and/or avoiding the drawbacks of the known processes.

Another object of the invention is to provide a process which permits decomposition of the starting material by relatively simple and relatively inexpensive apparatus in a comparatively short time.

It is yet another object of the invention to provide a process in which the reacting material passes through the equipment without the formation of deposits or crusts, allowing an operation that requires low maintenance, minimum down time, has a high efficiency and low cost.

Other objects and advantages of the invention will become apparent from the following description.

According to the invention, a magnesium chloride containing liquid is dried to form magnesium chloride hydrate. It may also contain other contaminating agents. The magnesium chloride hydrate is separated from the drying gases and then transferred into a decomposition chamber, wherein simultaneously introduced hot gases effect its decomposition into magnesium oxide and hydrochloric acid. According to other embodiments of the process of the present invention, the steps of drying and decomposition may occur in the same unit. By adjusting the temperature parameters, a mixture of magnesium oxide/magnesium chloride can be manufactured, in a wide variety of proportions.

The term "magnesium chloride hydrate" as used in the specification and claims refers to magnesium chloride hydrate containing up to 6 mols of water in the hydrate molecule. It is also possible to use $MgCl_2$, and it is therefore intended to include this salt, where "magnesium chloride hydrate" is mentioned hereinafter.

Reference is made to the accompanying drawing which shows the components of the equipment that can be used for the process herein described.

In the drawing, a spray dryer 1 is shown having a material inlet, an outlet 2 at its bottom and a tangential hot gas inlet 3. A duct 4 leads from outlet 2 to a tangential inlet 5 of separating cyclones 6. The cyclones 6 are under a slight vacuum supplied by an exhaust fan 7 through a duct 8. The separated material is removed by a duct 10, which is connected to a blower 12. The blower is connected through a pneumatic conveyor piping 14 to the bottom of a decomposition chamber 16.

Chamber 16 is also supplied by hot gases from a combustion chamber 18. The discharge occurs at the top of decomposition chamber 16 which is tangentially connected at 19 by a duct 22 with a cyclone 20. The solid material is discharged from cyclone 20 through a pipe 24, while the gaseous products leave through a duct 26. The gases can be selectively channeled either through an outlet 28 to another part of the plant or through 3, where they enter the spray dryer 1 in the above described tangential manner.

A solution containing magnesium chloride is fed into the spray dryer 1 where it is dried into magnesium chloride hydrate. In the process, the starting solution can be of a prepurified variety or in its unpurified, virgin state. The solution can be fed into the dryer through atomizing orifices either under its own pressure or by using compressed air. According to another method, disc-type atomizers might also be used.

The combustion gases used for the supplying of heat to the process contacts the liquid directly and the gas is introduced, similarly to the liquid, at the upper portion of the dryer and it aids in carrying the product out at the lower portion of the dryer. The temperature of the gas when introduced into the dryer at point 3 should be at least 400° C., but in order to obtain a better efficiency, in case of the presently described process, it is preferred that the temperature of the entering gases should be close to 800° C. Preferably, the liquid should enter under a pressure of 5 to 15 atmospheres above atmospheric pressure. In the case of atomizing orifices, the selection of the orifices with regard to size, shape, etc., has to conform to the pressure requirements in order to accomplish a fine degree of atomization and also to avoid crystallization on the walls of the spray dryer.

For the production of magnesium oxide, according to the present invention, it is most convenient if the material leaving the spray dryer contains approximately 2 mols of water, although the process to be described can be also used in conjunction with magnesium chloride having up to 6 mols of water.

In the drawing the combustion gas enters tangentially at the top of the drying tower 1 and then it is deflected into a vertical downward direction, finally leaves the dryer together with the magnesium chloride hydrate at its lower part 2. The gas and the magnesium chloride hydrate are removed from the dryer through duct 4 and preferably under suction, provided by exhaust fan 7, and subsequently, the hydrate is separated from the gas in a cyclone 6 or in a similar separating device. Having a slight vacuum in the spray dryer is advantageous, since it allows direct observation of the drying cycle and also allows maintenance of the atomizer without interruption of its operation. A slight vacuum also prevents a leaking out of the heating gases.

After separation, the hydrate is transferred through conveyor 14 by pneumatic or mechanical means into the decomposition chamber 16 for decomposition into MgO. In the drawing, conveyor 14 is of a pneumatic variety, where the pressure according to the preferred embodiment is supplied by blower 12. Pneumatic delivery is preferred, because the material can be blown into the reaction chamber more smoothly than by other methods and one can also obtain a better distribution of the delivered material than by using other known methods of delivery such as screw conveyor devices, etc.

The reaction chamber consists of two principal parts: a combustion chamber 18 and the decomposition chamber 16. The magnesium chloride hydrate enters at the bottom of the decomposition chamber 16 where it is mixed with the gases coming from the combustion chamber 18. The streaming gases drive the entering magnesium chloride hydrate to a distance of about 15 yards within a period of a few seconds and the decomposition is completed during that flight. The decomposition reaction of magnesium chloride hydrate having 2 mols of water is shown in the following stoichiometric equation:

$$MgCl_2 \cdot 2H_2O \rightarrow MgO + 2HCl + H_2O$$

The heating gases with the decomposed magnesium chloride hydrate, which is now magnesium oxide, are delivered through ductwork 19 into a cyclone 20, or similar separating device, entering the cyclone 20 at 22 in a known tangential manner. The separation of magnesium oxide from the gases is completed in the cyclone. The temperature of the heating gases during this separation is in the neighborhood of 800° C. The separated MgO is collected through pipe 24 at the bottom of cyclone 20.

The reaction chamber 16 can be equipped with hatches (not shown), through which the introduction of reacting mixture and the reaction itself can be observed. In case any unwarranted deposit formation occurs on the refractory lining of the reaction chamber 16, one can readily remove such obstructions through these hatches by any known means. When such hatches are used, it is preferred to have the decomposition chamber 16 under a slight vacuum.

The hydrochloric acid formed during the decomposition can be led to another part of the plant through outlet 28, for processing. The hot gases leaving the decomposition chamber through duct 26 after the magnesium oxide has been separated therefrom, can also be used for admission to the spray dryer, although if it is desired to produce hydrochloric acid of high concentration, it is preferred to supply the spray dryer from a separate source of hot gas.

According to another embodiment of the process, the decomposition into magnesium oxide can be accomplished in one step by using the spray dryer also for decomposition purposes. In this case, the gases entering the spray dryer-decomposition-chamber-combination are of a temperature exceeding 1000° C.

Magnesium oxide/magnesium chloride mixtures can be prepared in a variety of proportions by controlling the temperature between 200° C. and 700° C. Such mixtures can be used for a variety of applications such as in the building industry (Sorel cement).

As already indicated, a great variety of magnesium chloride-containing solutions can be used as a starting material for the process. One example of such a solution is a typical by-product of various chemical industries which, for example, is called black liquor in paper manufacturing. A typical composition of such a spent liquor can be for example:

| | G./l. |
|---|---|
| $MgCl_2$ | 315 |
| KCl | 40 |
| NaCl | 40 |
| $MgSO_4$ | 18 |
| $CaSO_4$ | 2.5 |
| $H_2O$ | 870 |

Quite commonly various by-products and spent solutions may contain magnesium chloride up to and also in excess of 460 g./l. Such spent liquors are readily available in the various chemical industries in such quantities that there never have been enough uses for them to absorb their total output.

It was found that a pure magnesium oxide can be obtained with the process of this invention from such spent liquors as shown in the example, because the alkali chloride components of the starting material can be separated in vapor form during the decomposition process from the MgO. In such case, the temperature of the combustion gases entering the reaction or decomposition chamber have to be in excess of 1300–1400° C. and they should have a temperature of about 900° C. when they leave the decomposition chamber. On an industrial scale, the purity of the MgO end product can be as high as 98–99%.

Other magnesium chloride containing solutions, such as brine, various mother liquors and sea water, can also be advantageously used for the process herein described. There is a practically endless supply of sea water available and its considerable concentration in magnesium chloride may make it an important raw material source. Since in the latter case the heat requirements for evaporation of the excess water may be higher than in the case of solutions containing a higher concentration of magnesium chloride, the sea water can be enriched to a certain degree in magnesium chloride, by pre-evaporation of some of the excess water, by using natural heat sources, such as solar evaporation, etc.

The following examples illustrate specific embodiments of the invention. All percentages are by weight unless otherwise specified.

*Example 1*

A not prepurified magnesium chloride containing solution, e.g. black liquor, containing about 370 g./l. $MgCl_2$, is atomized through atomizing orifices under 15 atmospheres excess pressure into a spray dryer. There the excess liquid is evaporated and the resulting magnesium chloride hydrate is separated from the gases in a cyclone. The magnesium chloride hydrate thus obtained is led to a pneumatic conveyor system for being blown into the reaction chamber through an intermediate stacking arrangement and a bucket wheel. Such a bucket wheel serves to maintain independent pressure conditions on both sides thereof while moving material in equal portions from its one side to the other side. The magnesium chloride hydrate in the decomposition chamber is converted into magnesium oxide by thermal decomposition and the end product leaves with the combustion gases. The temperature of the leaving gases is at about 800° C. The magnesium oxide is separated from the gases in a cyclone and the end product consists of 80–83% MgO, about 15% alkalies and the rest is magnesium sulfate and insoluble matter.

By using gas exit temperatures of about 900–950° C., one can obtain, without any change in the apparatus, a 98–99% pure magnesium oxide. The remainder in this case consists of sodium chloride, potassium chloride and magnesium sulfate. Magnesium chloride can be found in this, or in the above-mentioned product only in traces, which means that the decomposition was complete.

*Example 2*

A magnesium chloride containing solution with a $MgCl_2$ concentration of about 315–415 g./l. (prepurified black liquor) is atomized into a spray dryer-decomposition-chamber-combination, under 5–15 atmospheres pressure above normal atmospheric pressure, and it is joined by combustion gases having a temperature in the neighborhood of 1200° C. The gases travel in the same direction as the atomized material. The solution is dried within a few seconds. Without any particular interruption of the process, decomposition of the magnesium chloride hydrate into magnesium oxide and hydrochloric acid is accomplished when the exit temperature is maintained in the neighborhood of 700° C.

If the enter temperature of the combustion gases is higher, a more favorable thermal efficiency can be accomplished.

What we claim is:

1. A process for producing magnesium oxide from a magnesium chloride hydrate-containing starting material which comprises a two-stage operation, the first stage comprising the steps of introducing said material into a shaft type chamber in atomized state at a pressure ranging from 5 to 15 atm., passing combustion gases into said chamber at the same end with the magnesium chloride hydrate-containing material at the approximate temperature of 400 to 800° C., said gases carrying said atomized particles lengthwise along said chamber and causing evaporation of excess liquid therefrom, separating said dried magnesium chloride hydrate from said gases, conveying the magnesium chloride hydrate into a decomposition chamber, introducing simultaneously therewith combustion gases at a temperature whereby decomposition occurs in a few seconds, and separating substantially pure magnesium oxide from the HCl-containing gases, the temperature of the leaving gases being about 900–950° C.

2. The process according to claim 1 wherein said HCl-containing gases after being separated from said magnesium oxide are conducted into a drying chamber to provide heat for the production of magnesium chloride hydrate from a magnesium chloride-containing solution.

3. The process according to claim 1 wherein said magnesium chloride hydrate is transferred into said decomposition chamber by pneumatic means.

References Cited by the Examiner

UNITED STATES PATENTS

| | | | |
|---|---|---|---|
| 1,497,201 | 6/1924 | Wheat | 23—91 |
| 1,871,411 | 8/1932 | Heath | 23—91 X |
| 2,155,119 | 4/1939 | Ebner | 23—201 X |
| 2,277,827 | 3/1942 | Heath et al. | 23—91 |
| 2,288,610 | 7/1942 | Dean | 23—91 X |
| 2,394,570 | 2/1946 | Sturbelle | 23—201 X |
| 2,413,292 | 12/1946 | Christensen | 23—201 |
| 2,473,534 | 6/1949 | Lloyd | 23—91 X |
| 2,809,880 | 10/1957 | Dancy et al. | 23—201 |
| 2,954,277 | 9/1960 | Thomsen | 23—201 |
| 3,091,514 | 5/1963 | Leatham et al. | 23—20? |

FOREIGN PATENTS

| | | |
|---|---|---|
| 141,861 | 1/1961 | Russia. |

OSCAR R. VERTIZ, *Primary Examiner.*

MAURICE A. BRINDISI, A. J. STEWART, G. OZAKI,
*Assistant Examiners.*